United States Patent
Ono (10) Patent No.: US 8,228,231 B2
(45) Date of Patent: Jul. 24, 2012

(54) ANTENNA UNIT

(75) Inventor: Akira Ono, Nagoya (JP)

(73) Assignee: Buffalo Inc., Nagoya (JP)

( * ) Notice: Subject to any disclaimer, the term of this patent is extended or adjusted under 35 U.S.C. 154(b) by 162 days.

(21) Appl. No.: 12/763,099

(22) Filed: Apr. 19, 2010

(65) Prior Publication Data

US 2010/0265137 A1    Oct. 21, 2010

(30) Foreign Application Priority Data

Apr. 21, 2009    (JP) .................................. 2009-102563

(51) Int. Cl.
*H01Q 3/00* (2006.01)
*H01Q 3/12* (2006.01)
(52) U.S. Cl. ........................ 342/359; 342/374
(58) Field of Classification Search .................... 342/75, 342/359, 361, 374; 343/757, 876
See application file for complete search history.

(56) References Cited

FOREIGN PATENT DOCUMENTS

| JP | 11-88223 | 3/1999 |
| JP | 2002-223185 | 8/2002 |
| JP | 2003-347816 | 12/2003 |
| JP | 2005-117166 | 4/2005 |
| JP | 2005-167569 | 6/2005 |
| JP | 3815224 | 6/2006 |
| JP | 2008-17098 | 1/2008 |

OTHER PUBLICATIONS

Notification of Reason of Rejection dated Mar. 22, 2011 from Japanese Application No. 2009-102563.

*Primary Examiner* — Dao Phan
(74) *Attorney, Agent, or Firm* — Beyer Law Group LLP

(57) ABSTRACT

The antenna unit 100 includes a first antenna 10 positioned so as to face in the direction of gravity when the unit is oriented transversely, and a second antenna 20 positioned so as to face in the direction of gravity when the unit is oriented longitudinally. Based on the output of a sensor 50 that detects whether the antenna unit 100 is oriented transversely or oriented longitudinally, a switch controller 42 performs switching of an RF switch 30 so that the first antenna is used for reception or transmission of vertically polarized waves when the antenna unit 100 is oriented transversely, and the second antenna is used for reception or transmission of vertically polarized waves when the antenna unit 100 is oriented longitudinally.

14 Claims, 5 Drawing Sheets

Fig.1A
FIRST ORIENTATION
(TRANSVERSE ORIENTATION)

Fig.1B
SECOND ORIENTATION
(LONGITUDINAL ORIENTATION)

DIRECTION OF GRAVITY

Fig.5A
FIRST ORIENTATION
(TRANSVERSE ORIENTATION)

Fig.5B
SECOND ORIENTATION
(LONGITUDINAL ORIENTATION)

ANTENNA UNIT

BACKGROUND

1. Technical Field

The present invention relates to an antenna unit.

2. Related Art

Wireless communications devices are equipped with an antenna unit for transmission and reception of radio waves to and from other wireless communications devices. In antenna units of this kind, it is preferable for example for the orientation of the antenna provided to the antenna unit to be maintained in the direction of gravity in order to provide good transmission and reception of vertically polarized waves. Additionally, it is preferable for the orientation of the antenna provided to the antenna unit to be maintained in the horizontal direction (the direction orthogonal to the direction of gravity) in order to provide good transmission and reception of horizontally polarized waves.

Various techniques were proposed in the past for achieving good transmission and reception of radio waves in antenna units. For example, a mobile communications device with an internal antenna is provided with antenna retaining means for maintaining orientation of the antenna in the direction of gravity despite changes in orientation of the mobile communications device, thereby reducing the decline in reception of radio waves associated with changing orientation of the mobile communications device.

However, according to the above technique, because the support shaft of the antenna is disposed at a location away from the center axis of the antenna, and this support shaft is secured to the interior of the mobile communication device, it was not possible to maintain the orientation of the antenna in the direction of gravity when the orientation of the mobile communications device changed in the direction of revolution centered on an axis that is orthogonal to this support shaft.

Additionally, as wireless LANs (Local Area Networks) have become widespread, antenna unit-equipped mobile communications devices of a type designed for example to be used indoors on a desktop have become increasingly common. Mobile communications devices of this type are typically used either in so-called "transverse orientation" or "longitudinal orientation", so the orientation of the antenna of the antenna unit does not change frequently with respect to the direction of gravity. Thus, for this type of antenna unit, the above technique is not essential.

If a mobile communications device designed to be used in transverse orientation or in longitudinal orientation is furnished with a polarization diversity antenna system, good transmission and reception of radio waves is afforded regardless of whether the mobile communications device is used in transverse orientation or used in longitudinal orientation. However, some types of antenna units can not equip with the polarization diversity antenna system because of its circuit configuration.

An advantage of some aspects of the invention is to provide a novel technique relating to an antenna unit that affords good reception and/or transmission of prescribed polarized waves, even when the orientation of the antenna unit with respect to the direction of gravity changes.

The entire disclosure of Japanese patent application No. 2009-102563 of BUFFALO is hereby incorporated by reference into this document.

SUMMARY

The present invention is addressed to attaining the above objects at least in part according to the following modes of the invention.

First Aspect

An antenna unit comprising:

a first antenna;

a second antenna; and a changeover switch configured to switch between using the first antenna and using the second antenna for reception and/or transmission of prescribed polarized waves;

wherein the first antenna in the antenna unit is positioned facing in a direction such that sensitivity of the first antenna to the prescribed polarized waves is higher than that of the second antenna if the orientation of the antenna unit with respect to the direction of gravity is a first orientation; and the second antenna in the antenna unit is positioned facing in a direction such that the sensitivity of the second antenna to the prescribed polarized waves is higher than that of the first antenna if the orientation of the antenna unit with respect to the direction of gravity is a second orientation different from the first orientation, wherein if the orientation of the antenna unit with respect to the direction of gravity is the first orientation, the changeover switch performs switching so that reception and/or transmission of prescribed polarized waves takes place using the first antenna, or if the orientation of the antenna unit with respect to the direction of gravity is the second orientation, the changeover switch performs switching so that reception and/or transmission of prescribed polarized waves takes place using the second antenna.

According to this aspect, the "first orientation" and the "second orientation" for the antenna unit are defined in relative terms rather than being defined in absolute terms. Specifically, when a first reference orientation serving as a reference for the first orientation and a second reference orientation serving as a reference for the second orientation have been defined in relation to the orientation of the antenna unit with respect to the direction of gravity, the first and second orientations of the antenna unit are decided as follows. If the orientation of the antenna unit with respect to the direction of gravity more closely approximates the first reference orientation than the second reference orientation, the orientation of the antenna unit with respect to the direction of gravity is the first orientation. If on the other hand the orientation of the antenna unit with respect to the direction of gravity more closely approximates the second reference orientation than the first reference orientation, the orientation of the antenna unit with respect to the direction of gravity is the second orientation.

According to the antenna unit of the first aspect, if the orientation of the antenna unit with respect to the direction of gravity is the first orientation, through switching of the changeover switch, reception or transmission of prescribed polarized waves can be carried out using the first antenna, which is suited to this first orientation and which has higher sensitivity to the prescribed polarized wave than does the second antenna. Or, if the orientation of the antenna unit with respect to the direction of gravity is the second orientation, through switching of the changeover switch, reception or transmission of prescribed polarized waves can be carried out using the second antenna, which is suited to this second orientation and which has higher sensitivity to the prescribed polarized wave than does the first antenna. Consequently, according to the antenna unit of the first aspect, it is possible to achieve good reception or transmission of prescribed polarized waves even if the orientation of the antenna unit with respect to the direction of gravity changes between the first orientation and the second orientation.

The antenna unit of the first aspect is not limited two antenna types, namely, the first antenna and the second antenna mentioned above. For example, the antenna unit of the first aspect may be additionally provided with a third antenna positioned facing in a direction such that its sensitivity to prescribed polarized waves is higher than that of the first and second antennas when the orientation of the antenna unit with respect to the direction of gravity is a third orientation different from the first and second orientations. In this case, the changeover switch may be designed to capable of switching to reception or transmission of prescribed polarized waves using the third antenna when the orientation of the antenna unit with respect to the direction of gravity is the third orientation. In the antenna unit of the first aspect, the number of possible orientations with respect to the direction of gravity and the number of types of antenna suited to these different orientations should correspond.

Second Aspect

The antenna unit in accordance with the first aspect further comprising:

a sensor configured to detect the orientation of the antenna unit with respect to the direction of gravity; and a changeover switch controller configured to control the changeover switch based on the detected orientation.

According to the antenna unit of the second aspect, the changeover switch controller is able to determine the orientation of the antenna unit with respect to the direction of gravity on the basis of the output of the sensor, and automatically switch the changeover switch controller. Sensor output may consist of two different outputs indicating whether the orientation of the antenna unit with respect to the direction of gravity is the first orientation or the second orientation; or of output representing inclination angle with respect to the direction of gravity.

Third Aspect

The antenna unit in accordance with the first aspect further comprising:

a gravity switch configured to switch between open and closed state depending on the orientation of the antenna unit with respect to the direction of gravity; and a changeover switch controller configured to control the changeover switch based on the state of the gravity switch.

According to the antenna unit of the third aspect, the changeover switch controller is able to determine the orientation of the antenna unit with respect to the direction of gravity on the basis of whether the gravity switch is open or closed, and automatically switch the changeover switch controller. If the gravity switch was set up to assume the open state when the orientation of the antenna unit with respect to the direction of gravity is the first orientation, it will assume the closed state when the orientation of the antenna unit with respect to the direction of gravity is the second orientation. Or, if the gravity switch was set up to assume the closed state when the orientation of the antenna unit with respect to the direction of gravity is the first orientation, it will assume the open state when the orientation of the antenna unit with respect to the direction of gravity is the second orientation.

Fourth Aspect

The antenna unit in accordance with the first aspect further comprising:

a control switch operated by user according to the orientation of the antenna unit with respect to the direction of gravity; and a changeover switch controller configured to control the changeover switch based on setting of the control switch.

According to the antenna unit of the fourth aspect, the changeover switch controller is able to determine the orientation of the antenna unit with respect to the direction of gravity on the basis of the setting of the control switch, and switch the changeover switch controller accordingly. In the antenna unit of this aspect, the changeover switch controller may be omitted, and the changeover switch may be designed to switch in coordination with the setting of the control switch.

Fifth Aspect

The antenna unit in accordance with the first aspect, wherein the first antenna and the second antenna respectively include a plurality of antennas for multiplex communication.

According to the antenna unit of the fifth aspect, reception and/or transmission of different signals may be carried out using a plurality of antennas in each orientation, to achieve faster wireless communication speeds.

Sixth Aspect

The antenna unit in accordance with the first aspect including a chassis having approximately rectangular shape in cross section when viewed from a prescribed direction;

wherein the first orientation is an orientation in which a plane containing a first side of the approximately rectangular shape of the chassis is approximately perpendicular to the direction of gravity;

the second orientation is an orientation in which a plane containing a second side orthogonal to the first side of the approximately rectangular shape of the chassis is approximately perpendicular to the direction of gravity; and the first antenna and the second antenna are situated facing in directions 90° apart from one another when viewed from the prescribed direction.

The antenna unit of the sixth aspect is an antenna unit designed to be used in transverse orientation or in longitudinal orientation. According to the antenna unit of the sixth aspect, good reception and/or transmission of the prescribed polarized waves is possible regardless of whether the antenna unit is used transverse orientation or used in longitudinal orientation.

Seventh Aspect

The antenna unit in accordance with the sixth aspect, wherein the prescribed polarized waves are vertically polarized waves; and the first antenna is situated in the antenna unit so as to extend along the direction of gravity when the orientation of the antenna unit with respect to the direction of gravity is the first orientation.

According to the antenna unit of the seventh aspect, if the orientation of the antenna unit with respect to the direction of gravity is the first orientation, good reception and transmission of vertically polarized waves may be attained using the first antenna. If the orientation of the antenna unit with respect to the direction of gravity is the second orientation, good reception and transmission of vertically polarized waves may be attained using the second antenna.

Eighth Aspect

The antenna unit in accordance with claim the sixth aspect, wherein the prescribed polarized waves are horizontally polarized waves; and the first antenna is situated in the antenna unit so as to extend along a direction perpendicular to the direction of gravity when the orientation of the antenna unit with respect to the direction of gravity is the first orientation.

According to the antenna unit of the eighth aspect, if the orientation of the antenna unit with respect to the direction of gravity is the first orientation, good reception and/or transmission of horizontally polarized waves may be attained using the first antenna. If the orientation of the antenna unit with respect to the direction of gravity is the second orientation, good reception and/or transmission of horizontally polarized waves may be attained using the second antenna.

In addition to the antenna unit embodiment described above, the present invention may be embodied as a wireless communications device invention furnished with the antenna unit described above.

These and other objects, features, aspects, and advantages of the present invention will become more apparent from the following detailed description of the preferred embodiments with the accompanying drawings.

DESCRIPTION OF PREFERRED EMBODIMENT

The mode for carrying out the invention will be described below based on the preferred embodiments.

A. Embodiment 1

Figure 1A:
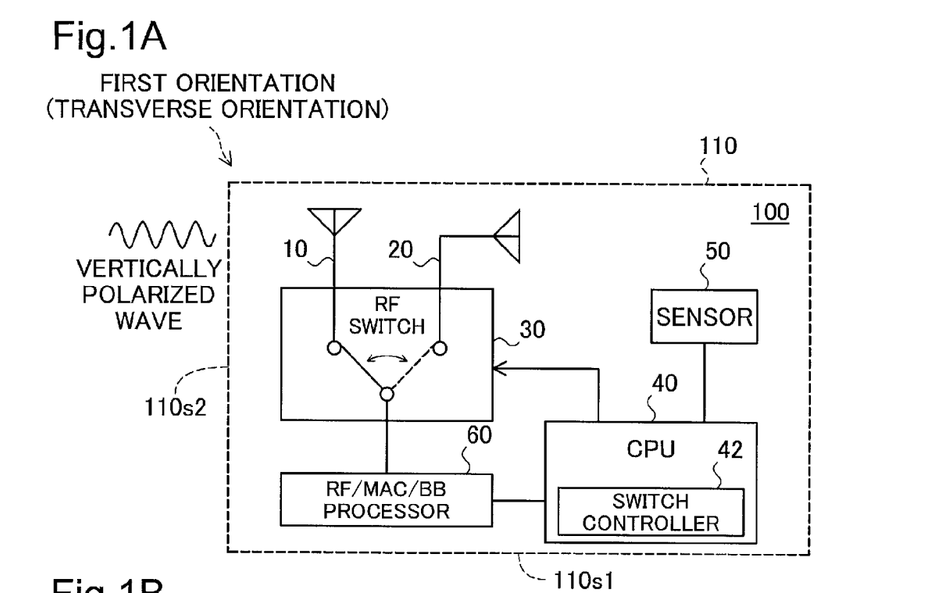
FIGS. 1A and 1B depict the general features of an antenna unit 100 according to Embodiment 1 of the present invention.
Figure 1B:
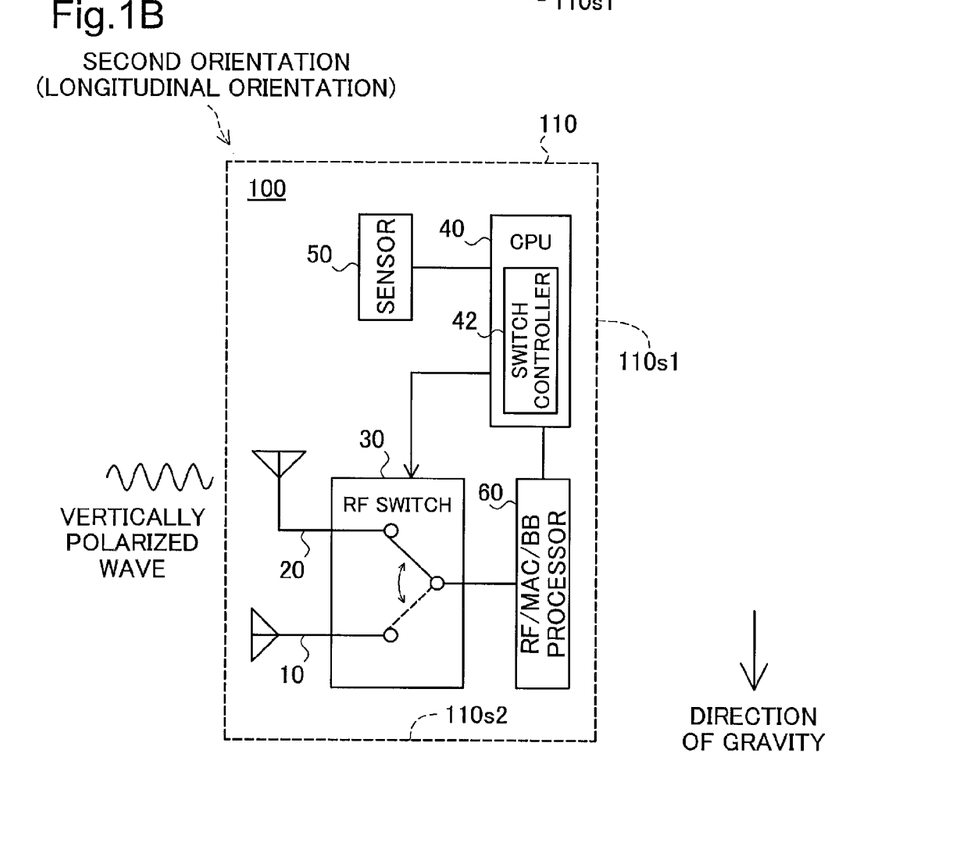

FIG. 1 is an illustration depicting the general features of an antenna unit 100 according to Embodiment 1 of the present invention. As shown, the antenna unit 100 of the present embodiment is furnished with a chassis 110 of rectangular shape in cross section. The antenna unit 100 may be used in a first orientation (transverse orientation) in which the plane that includes the long side 110s1 of the rectangular cross section of the chassis 110 is orthogonal to the direction of gravity as depicted in FIG. 1A; or in a second orientation (longitudinal orientation) in which the plane that includes the short side 110s2 of the rectangular cross section of the chassis 110 is orthogonal to the direction of gravity as depicted in FIG. 1B.

The antenna unit 100 includes a first antenna 10, a second antenna 20, an RF switch 30, a CPU 40, a sensor 50, and an RF/MAC/BB processor 60. The CPU 40 include a switch controller 42.

The first antenna 10 in the antenna unit 100 is positioned so as to extend along the direction of gravity with the antenna unit 100 oriented transversely (see FIG. 1A), in order to afford good reception and transmission of vertically polarized waves when the antenna unit 100 is oriented transversely. The second antenna 20 in the antenna unit 100 is positioned so as to extend along the direction of gravity with the antenna unit 100 oriented longitudinally (see FIG. 1B), in order to afford good reception and transmission of vertically polarized waves. That is, the first antenna 10 and the second antenna 20 are situated facing in directions 90° apart when viewed from the illustrated direction.

The sensor 50 outputs the orientation of the antenna unit 100 with respect to the direction of gravity, that is, whether the antenna unit 100 is transversely oriented or longitudinally oriented. In the present embodiment, if the antenna unit 100 is transversely oriented, the sensor 50 outputs a first signal indicating that the antenna unit 100 is transversely oriented. If the antenna unit 100 is longitudinally oriented, the sensor 50 outputs a second signal indicating that the antenna unit 100 is longitudinally oriented.

As the sensor 50 it is possible to use, for example, an acceleration sensor, a gyro sensor, an inclination sensor, or the like. If an acceleration sensor, a gyro sensor, or an inclination sensor is employed as the sensor 50, with the orientation of the antenna unit 100 when transversely oriented on a horizontal surface serving as the point of reference (e.g. assigned an inclination angle of 0) for example, the sensor 50 may output a first signal when the inclination angle of the antenna unit 100 is 0±45 degrees, and output a second signal when the inclination angle of the antenna unit 100 is 90±45 degrees, for example. Alternatively, the sensor 50 may output a first signal when the inclination angle of the antenna unit 100 is 0±10 degrees; output a second signal when the inclination angle of the antenna unit 100 is 90±10 degrees; and output an error signal indicating that the antenna unit 100 is not correctly positioned if the inclination angle of the antenna unit 100 is an angle other than 0±10 or 90±10 degrees, for example.

It is also possible to employ a contact sensor as the sensor 50. If a contact sensor is employed as the sensor 50, by situating the contact sensor on the surface of the chassis 110 that contacts the installation face, in other words, on the surface of the chassis 110 lying towards the lower side when the antenna unit 100 is installed, the sensor can detect whether the antenna unit 100 is oriented transversely or oriented longitudinally through detection of the state of contact with the installation face.

The switch controller 42 switches the RF switch 30 based on the output of the sensor 50. Specifically, if the antenna unit 100 is oriented transversely as depicted in FIG. 1A, based on the first type of signal that is output by the sensor 50 the switch controller 42 decides that the antenna unit 100 is oriented transversely, and switches the RF switch 30 so that reception or transmission of vertically polarized waves is carried out using the first antenna 10. If on the other hand the antenna unit 100 is oriented longitudinally as depicted in FIG. 1B, based on the second type of signal that is output by the sensor 50 the switch controller 42 decides that the antenna unit 100 is oriented longitudinally, and switches the RF switch 30 so that reception or transmission of vertically polarized waves is carried out using the second antenna 20.

The RF/MAC/BB processor 60 carries out RF processes (RF: Radio Frequency), MAC processes (MAC: Media Access Control), and BB processes (BB: Base Band) during reception or transmission of radio waves. These processes will not be discussed in detail herein.

According to the antenna unit 100 of Embodiment 1 described above, the orientation of the antenna unit 100 with respect to the direction of gravity is determined on the basis of the output of the sensor 50; and if the orientation of the antenna unit 100 with respect to the direction of gravity is a first orientation (transverse orientation), reception or transmission of vertically polarized waves may be carried out satisfactorily using the first antenna 10 suited to this first orientation, or if the orientation of the antenna unit 100 with respect to the direction of gravity is a second orientation (longitudinal orientation), reception or transmission of vertically polarized waves may be carried out satisfactorily using the second antenna 20 suited to this second orientation.

B. Embodiment 2

FIG. 2 is an illustration depicting the general features of an antenna unit 100A according to Embodiment 2 of the present invention. As will be apparent from a comparison of FIG. 2 with FIG. 1, the antenna unit 100A of the present embodiment is provided with a gravity switch 50A in place of the sensor 50 in the antenna unit 100 of Embodiment 1. Also, the CPU 40 of the antenna unit 100A of the present embodiment is provided with a switch controller 42A in place of the switch controller 42 in the antenna unit 100 of Embodiment 1. Other features of the antenna unit 100A are identical to the features of the antenna unit 100 of Embodiment 1.

The gravity switch 50A is a switch that changes between the open and closed state, depending on the direction in which gravity is acting. In the present embodiment, the gravity switch 50A in the antenna unit 100A assumes the closed state when the antenna unit 100A is oriented transversely, and assumes the open state when the antenna unit 100A is oriented longitudinally. The gravity switch 50A in the antenna unit 100A could also be positioned so as to assume the open state when the antenna unit 100A is oriented transversely, and assume the closed state when the antenna unit 100A is oriented longitudinally.

Figure 2A:
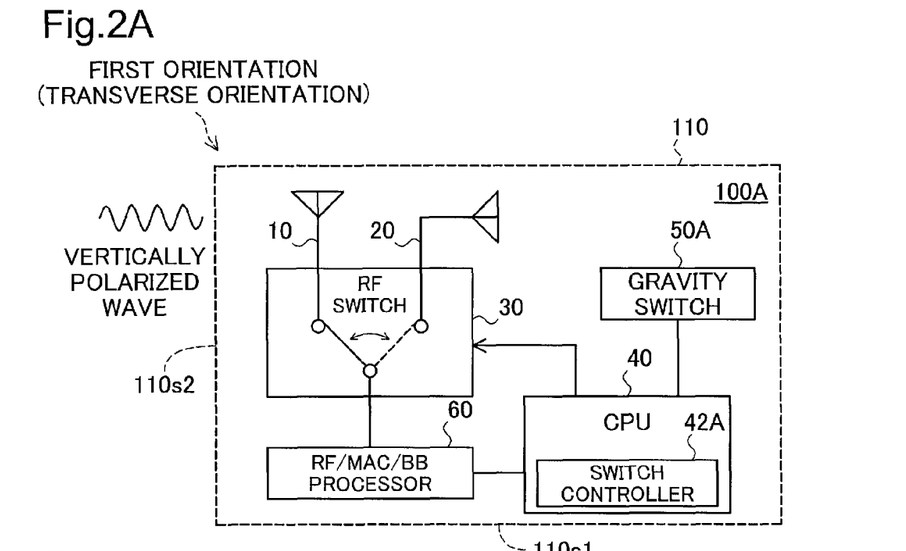
FIGS. 2A and 2B depict the general features of an antenna unit 100A according to Embodiment 2 of the present invention.
Figure 2B:
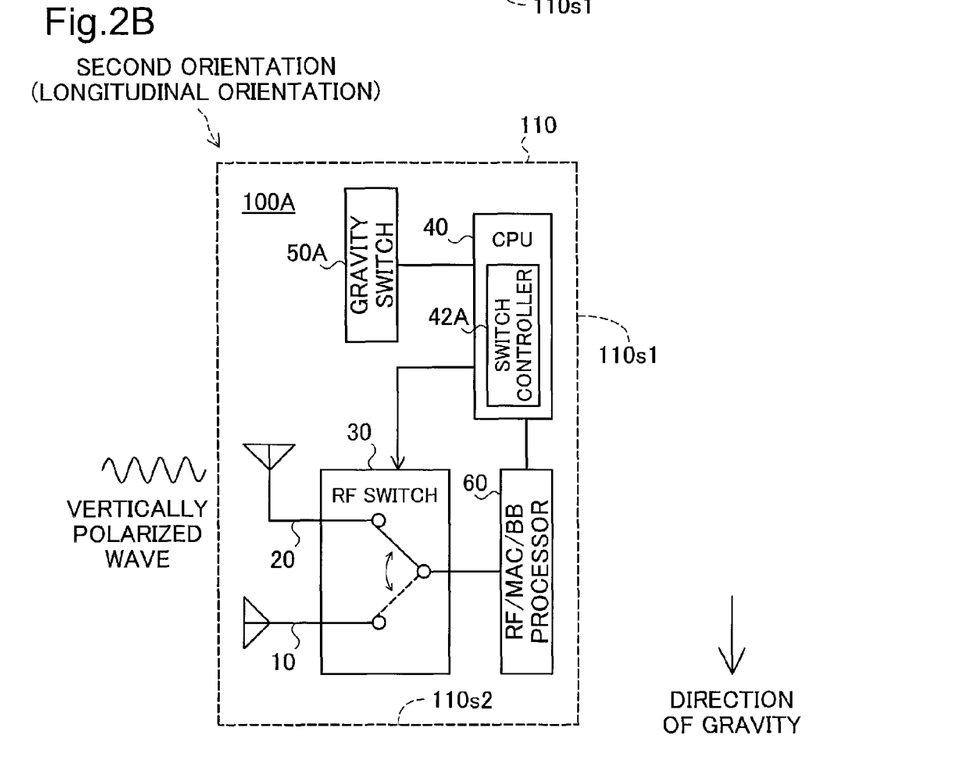

The switch controller 42A switches the RF switch 30 according to whether the gravity switch 50A is in the open or closed state. Specifically, if the antenna unit 100A is oriented transversely as depicted in FIG. 2A, based on the fact that the gravity switch 50A is in the closed state, the switch controller 42A decides that the antenna unit 100A is oriented transversely and switches the RF switch 30 so that reception or transmission of vertically polarized waves is carried out using the first antenna 10. If the antenna unit 100A is oriented longitudinally as depicted in FIG. 2B, based on the fact that the gravity switch 50A is in the open state, the switch controller 42A decides that the antenna unit 100A is oriented longitudinally and switches the RF switch 30 so that reception or transmission of vertically polarized waves is carried out using the second antenna 20.

According to the antenna unit 100A of Embodiment 2 described above, the orientation of the antenna unit 100A with respect to the direction of gravity is determined on the basis of whether the gravity switch 50A is in the open or closed state; and if the orientation of the antenna unit 100A with respect to the direction of gravity is a first orientation (transverse orientation), reception or transmission of vertically polarized waves may be carried out satisfactorily using the first antenna 10 suited to this first orientation, or if the orientation of the antenna unit 100A with respect to the direction of gravity is a second orientation (longitudinal orientation), reception or transmission of vertically polarized waves may be carried out satisfactorily using the second antenna 20 suited to this second orientation.

C. Embodiment 3

FIG. 3 is an illustration depicting the general features of an antenna unit 100B according to Embodiment 3 of the present invention. As will be apparent from a comparison of FIG. 3 with FIG. 1, the antenna unit 100B of the present embodiment is provided with a user-operated control switch 50B in place of the sensor 50 in the antenna unit 100 of Embodiment 1. Also, the CPU 40 of the antenna unit 100B of the present embodiment is provided with a switch controller 42B in place of the switch controller 42 in the antenna unit 100 of Embodiment 1. Other features of the antenna unit 100B are identical to the features of the antenna unit 100 of Embodiment 1.

As depicted in model form in the drawings, the control switch 50B in the present embodiment is a slide switch in which the point of contact is switched through sliding of the position of a lever by the user. If the antenna unit 100B is oriented transversely, the user slides the lever of the control switch 50B to the "Transverse" position, or if the antenna unit 100B is oriented longitudinally, the user slides the lever of the control switch 50B to the "Longitudinal" position. A button switch, rotary switch, or some other type of control switch could also be used as the control switch 50B.

Figure 3A:
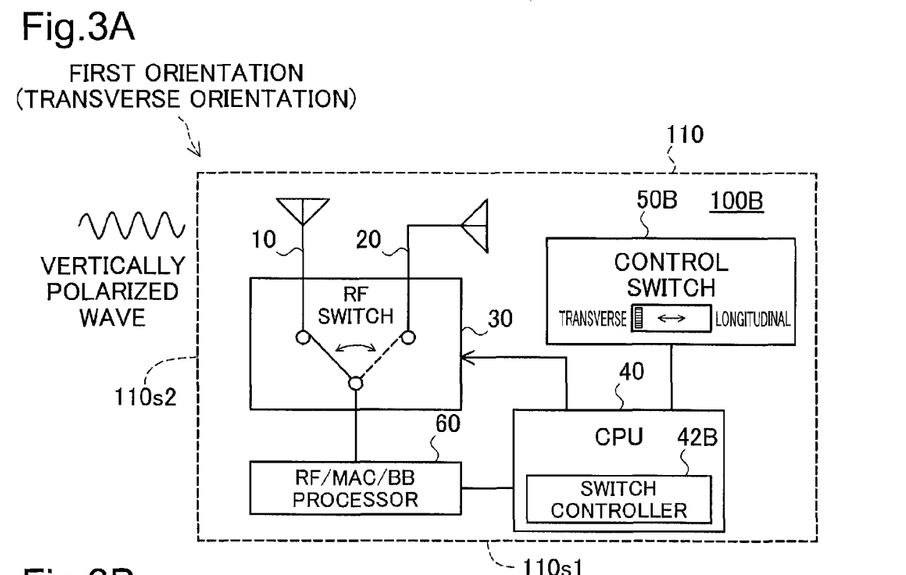
FIGS. 3A and 3B depict the general features of an antenna unit 100B according to Embodiment 3 of the present invention.
Figure 3B:
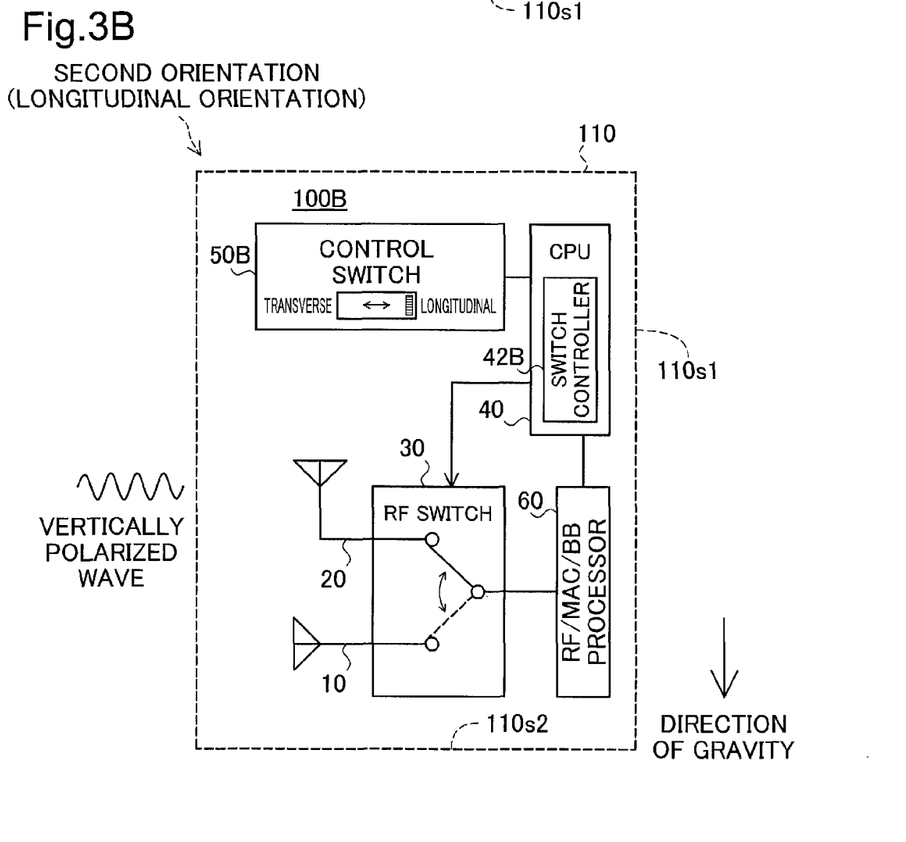

The switch controller 42B switches the RF switch 30 according to the setting of the control switch 50B. Specifically, if the antenna unit 100B is oriented transversely and the control switch 50B is set to the "Transverse" position as depicted in FIG. 3A, the switch controller 42B switches the RF switch 30 so that reception or transmission of vertically polarized waves is carried out using the first antenna 10. If the antenna unit 100B is oriented longitudinally and the control switch 50B is set to the "Longitudinal" position as depicted in FIG. 3B, the switch controller 42B switches the RF switch 30 so that reception or transmission of vertically polarized waves is carried out using the second antenna 20. This RF switch 30 switching decision may be made on the basis of a Hi/Low signal output from the control switch 50B to a GPIO (General Purpose Input/Output) provided to the CPU 40, for example.

According to the antenna unit 100B of Embodiment 3 described above, the orientation of the antenna unit 100B with respect to the direction of gravity is determined according to the setting of the control switch 50B; and if the orientation of the antenna unit 100B with respect to the direction of gravity is a first orientation (transverse orientation), reception or transmission of vertically polarized waves may be carried out satisfactorily using the first antenna 10 suited to this first orientation, or if the orientation of the antenna unit 100B with respect to the direction of gravity is a second orientation (longitudinal orientation), reception or transmission of vertically polarized waves may be carried out satisfactorily using the second antenna 20 suited to this second orientation.

D. Modified Examples

While the invention has been shown herein in terms of several preferred embodiments, the invention is not limited to such embodiments and may be reduced to practice in various other modes without departing from the spirit thereof, such as the following modifications for example.

D1. Modified Example 1

Figure 4:
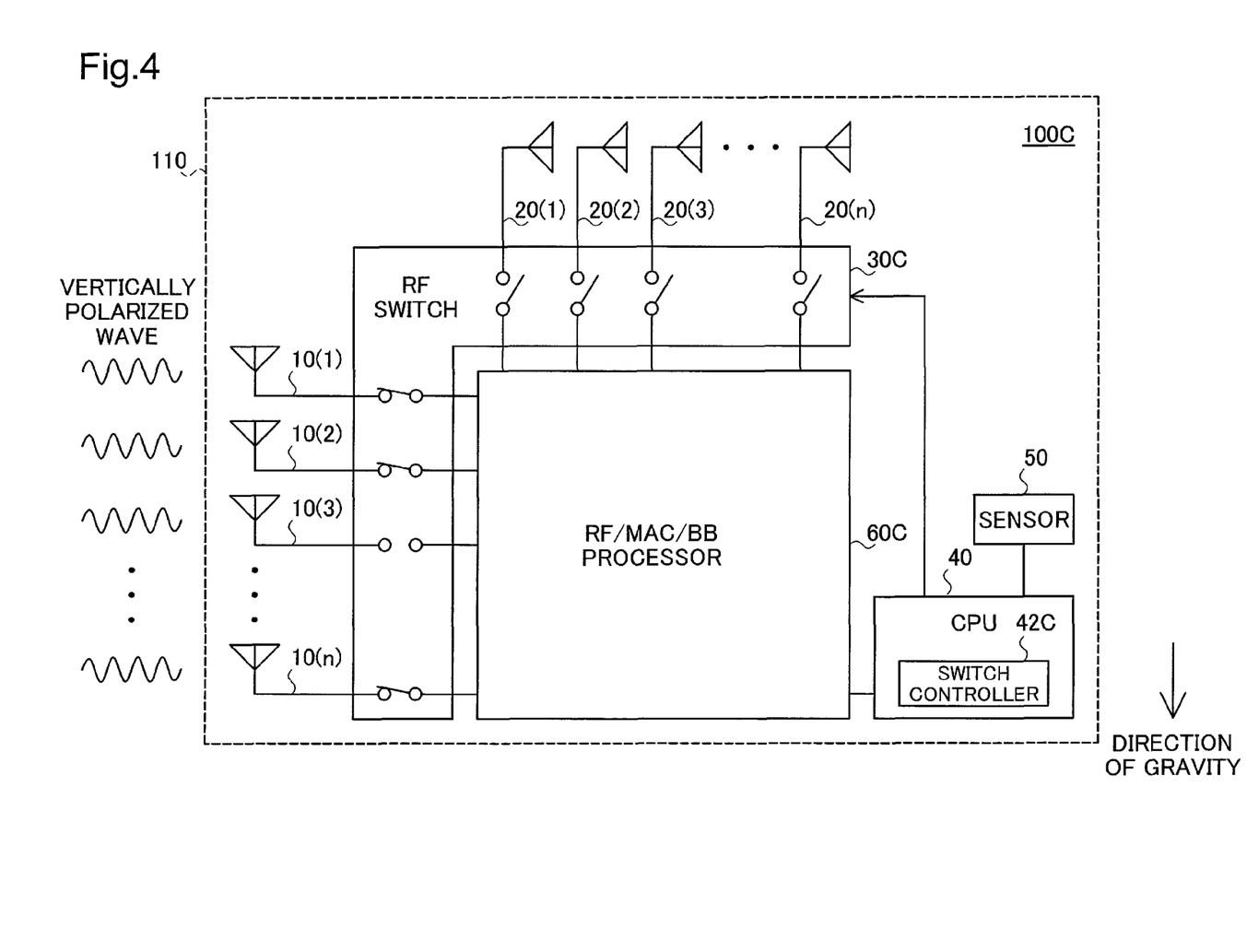
FIG. 4 depicts the general features of an antenna unit 100C according to Modified Example 1 of Embodiment 1 of the present invention.

FIG. 4 is an illustration depicting the general features of an antenna unit 100C according to Modified Example 1 of Embodiment 1 of the present invention. The antenna unit 100C of the present modified example is a MIMO (Multiple Input Multiple Output) compatible antenna unit. FIG. 4 depicts the antenna unit 100C oriented transversely.

As will be apparent from a comparison of FIG. 4 with FIG. 1, the antenna unit 100C of the present modified example is provided with a plurality of second antennas 10(1) to 10(n) in place of the first antenna 10 in the antenna unit 100 of Embodiment 1. The first antennas 10(1) to 10(n) are positioned spatially apart, and are also positioned so as to extend along the direction of gravity when the antenna unit 100C is oriented transversely, so as to afford good reception or transmission of vertically polarized waves when the antenna unit 100C is oriented transversely.

The antenna unit 100C is also provided with a plurality of second antennas 20(1) to 20(n) in place of the second antenna 20 in the antenna unit 100 of Embodiment 1. Like the first antennas 10(1) to 10(n), the second antennas 20(1) to 20(n) are positioned spatially apart, and are positioned so as to extend along the direction of gravity when the antenna unit 100C is oriented longitudinally, so as to afford good reception or transmission of vertically polarized waves when the antenna unit 100C is oriented longitudinally.

In place of the RF switch 30 in the antenna unit 100 of Embodiment 1, the antenna unit 100C is provided with an RF switch 30C for switching between reception or transmission of vertically polarized waves using the first antennas 10(1) to 10(n), and reception or transmission of vertically polarized waves using the second antennas 20(1) to 20(n). Also, in place of the RF/MAC/BB processor 60 in the antenna unit 100 of Embodiment 1, the antenna unit 100C is provided with a MIMO-compatible RF/MAC/BB processor 60C. In place of the switch controller 42 in the antenna unit 100 of Embodiment 1, the CPU 40 of the antenna unit 100C of the present modified example is provided with a switch controller 42C. However, the sensor 50 of the antenna unit 100C is identical to the sensor 50 in the antenna unit 100 of Embodiment 1.

Like the switch controller 42 in the antenna unit 100 of Embodiment 1, the switch controller 42C switches the RF switch 30C on the basis of the output of the sensor 50. Specifically, if the antenna unit 100C is oriented transversely as depicted in FIG. 4, based on the first type of signal that is output by the sensor 50, the switch controller 42C decides that the antenna unit 100C is oriented transversely and switches the RF switch 30C so that reception or transmission of vertically polarized waves is carried out using the first antennas 10(1) to 10(n). While not depicted in the drawing, if on the other hand the antenna unit 100C is oriented longitudinally, based on the second type of signal that is output by the sensor 50, the switch controller 42C decides that the antenna unit 100C is oriented longitudinally and switches the RF switch 30C so that reception or transmission of vertically polarized waves is carried out using the second antennas 20(1) to 20(n).

During reception or transmission of radio waves, the RF/MAC/BB processor 60C carries out MIMO-compatible RF processes (RF: Radio Frequency), MAC processes (MAC: Media Access Control), and BB processes (BB: Base Band) during reception or transmission of radio waves. These processes will not be discussed in detail herein.

According to the antenna unit 100C of Modified Example 1 described above, as with the antenna unit 100 of Embodiment 1, the orientation of the antenna unit 100C with respect to the direction of gravity is determined on the basis of the output of the sensor 50; and if the orientation of the antenna unit 100C with respect to the direction of gravity is a first orientation (transverse orientation), reception or transmission of vertically polarized waves may be carried out satisfactorily using the first antennas 10(1) to 10(n) suited to this first orientation, or if the orientation of the antenna unit 100C with respect to the direction of gravity is a second orientation (longitudinal orientation), reception or transmission of vertically polarized waves may be carried out satisfactorily using the second antennas 20(1) to 20(n) suited to this second orientation.

According to the antenna unit 100C of the present modified example, reception or transmission of different signals may be carried out using a plurality of antennas in each orientation, to achieve faster wireless communication speeds.

D2. Modified Example 2

FIG. 5 is an illustration depicting the general features of an antenna unit 100C according to Modified Example 2 of Embodiment 1 of the present invention. The antenna unit 100D of the present modified example differs from the antenna units 100, 100A, 100B of the preceding embodiments in that the unit receives and transmits horizontally polarized waves.

As will be apparent from a comparison of FIG. 5 with FIG. 1, in the antenna unit 100D of the present modified example, the CPU 40 of the antenna unit 100D is provided with a switch controller 42D in place of the switch controller 42 in the antenna unit 100 of Embodiment 1. Other features of the antenna unit 100D are identical to the features of the antenna unit 100 of Embodiment 1.

Figure 5A:
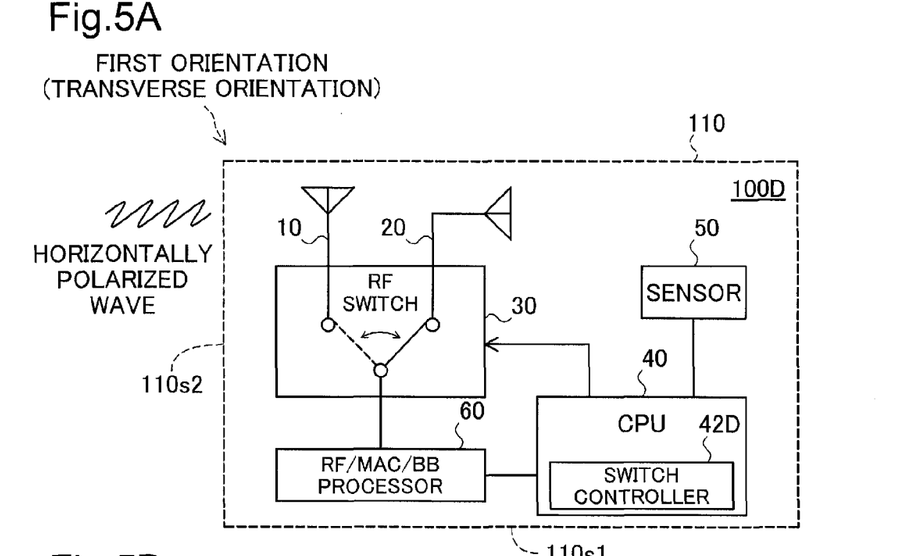
FIGS. 5A and 5B depict the general features of an antenna unit 100D according to Modified Example 2 of Embodiment 1 of the present invention.
Figure 5B:
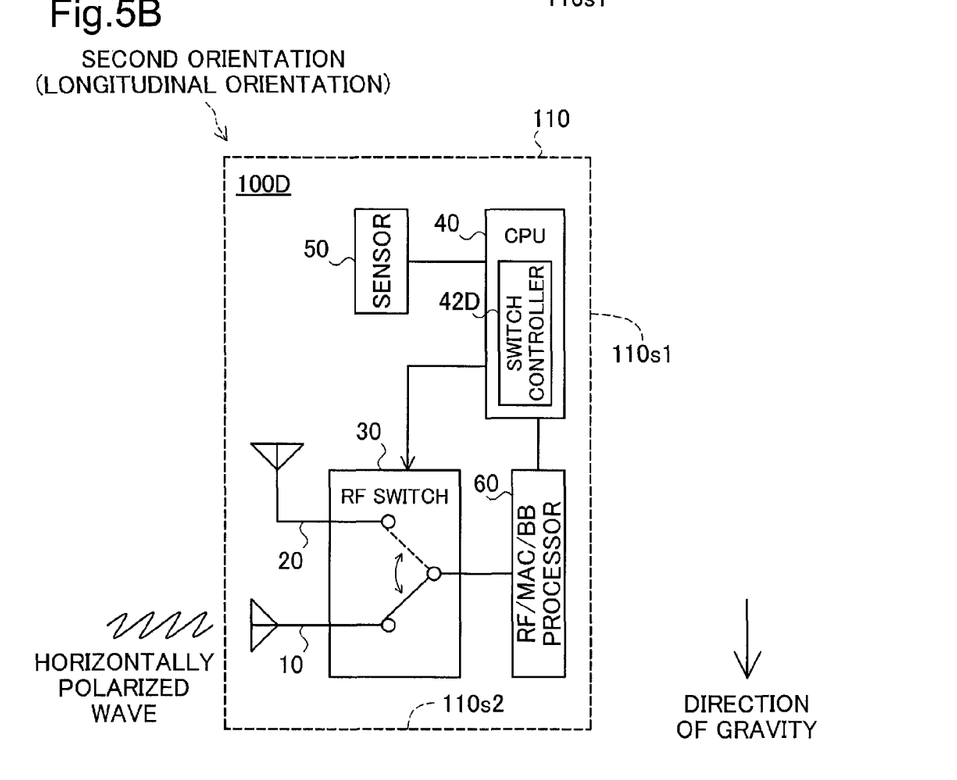

The switch controller 42D switches the RF switch 30 on the basis of the output of the sensor 50. Specifically, if the antenna unit 100D is oriented transversely as depicted in FIG. 5A, based on the first type of signal that is output by the sensor 50, the switch controller 42D decides that the antenna unit 100D is oriented transversely and switches the RF switch 30 so that reception or transmission of horizontally polarized waves is carried out using the second antenna 20. If on the other hand the antenna unit 100D is oriented longitudinally as depicted in FIG. 5B, based on the second type of signal that is output by the sensor 50, the switch controller 42D decides that the antenna unit 100D is oriented longitudinally and switches the RF switch 30C so that reception or transmission of horizontally polarized waves is carried out using the first antenna 10.

According to the antenna unit 100D of Modified Example 2 described above, the orientation of the antenna unit 100D with respect to the direction of gravity is determined on the basis of the output of the sensor 50; and if the antenna unit 100D is oriented transversely, reception or transmission of horizontally polarized waves may be carried out satisfactorily using the second antenna 20 suited to transverse orientation, or if the antenna unit 100 is oriented longitudinally, reception or transmission of horizontally polarized waves may be carried out satisfactorily using the first antenna 10 suited to longitudinal orientation.

D3. Modified Example 3

In the antenna unit 100B of Embodiment 3 above, a slide switch is employed as the control switch 50B, and the setting of this slide switch must be switched by the user intentionally; however, the present invention is not limited to such an arrangement. A control switch 50B adapted to switch settings automatically without any intentional action by the user could be implemented in the antenna unit 100B instead.

For example, in some instances the chassis 110 is provided with a stand in order to prevent the antenna unit 100B from tipping over when the antenna unit 100B is oriented longitudinally. In such instances, the control switch 50B could be designed to switch settings in coupled operation with attachment and detachment of the stand to and from the chassis 110. The control switch 50B used in such a mode could be button switch for example; and designed for example so that the button switch is depressed automatically by the stand when the chassis 110 is mounted onto the stand, indicating that the antenna unit 100B is oriented longitudinally, and so that the button switch ceases to be depressed when the chassis 110 is detached from the stand, indicating that the antenna unit 100B is oriented transversely. Alternatively, instead of a button switch, a slide switch that switches settings automatically in coupled operation with attachment and detachment of the stand may be employed.

In yet another arrangement, a button switch could be provided on a surface that includes a long side s1 of the chassis 110, so that when the antenna unit 100B is oriented transversely the button switch is depressed automatically by the installation face, indicating that the antenna unit 100B is oriented transversely, and that when the antenna unit 100B is oriented longitudinally, the button switch ceases to be depressed when the chassis 110 is detached from the stand, indicating that the antenna unit 100B is oriented longitudinally.

D4. Modified Example 4

In the antenna unit 100C of Modified Example 1 and in the antenna unit 100D of Modified Example 2 above, the RF switch 30C, 30D was switched on the basis of output of the sensor 50; however, switching of the RF switch 30C, 30D could instead take place on the basis of the open/closed state of the gravity switch 50A or on the setting of the control switch 50B, as in the antenna unit 100A of Embodiment 2 and the antenna unit 100B of Embodiment 3 discussed previously.

D5. Modified Example 5

In the antenna units 100A, 100B of Embodiments 2 and 3, the antennas 10, 20 were designed to receive or transmit vertically polarized waves, but could instead be used to receive or transmit horizontally polarized waves like the antenna unit 100D of Modified Example 2 above. In this case, switching of the RF switch 30 would be reversed, as in the antenna unit 100D of Modified Example 2. A similar arrangement could be adopted for the antenna unit 100C of Modified Example 1 as well.

D6. Modified Example 6

In the antenna units 100, 100A, 100B of Embodiments 1 to 3, the orientation of the antenna units 100, 100A, 100B with respect to the direction of gravity is either of two orientations, namely, transverse orientation (first orientation) and longitudinal orientation (second orientation); however, the present invention is not limited thereto. For example, the antenna unit 100, 100A, or 100B of any of Embodiments 1 to 3 may be additionally provided with a third antenna positioned facing in a direction affording higher sensitivity to vertically polarized waves than the first and second antennas 10, 20 when the orientation of the antenna unit 100, 100A, or 100B with respect to the direction of gravity is a third orientation different from the first and second orientations. In this case, the RF switch will be switchable to receive or transmit vertically polarized waves using the third antenna when the orientation of the antenna unit 100, 100A, or 100B with respect to the direction of gravity is the third orientation. A similar arrangement could be adopted for the antenna units of the Modified Examples above as well.

D7. Modified Example 7

In the antenna units 100, 100A, 100B of Embodiments 1 to 3, the chassis 110 of the antenna unit 100, 100A, 100B has a rectangular shape in cross section; however, the present invention is not limited thereto. The antenna unit 100, 100A, 100B may have some other cross sectional shape.

D8. Modified Example 8

The antenna unit in any of the preceding Embodiments and Modified Examples may be additionally provided with a polarized wave changeover switch for switching between reception/transmission of vertically polarized waves and reception/transmission of horizontally polarized waves. Such an arrangement enables the antenna unit to be easily switched between reception/transmission of the different polarized waves.

The Program product may be realized as many aspects. For example:

(i) Computer readable medium, for example the flexible disks, the optical disk, or the semiconductor memories;
(ii) Computer including the computer readable medium, for example the magnetic disks or the semiconductor memories; and
(iii) Computer temporally storing the computer program in the memory through the data transferring means.

While the invention has been described with reference to preferred exemplary embodiments thereof, it is to be understood that the invention is not limited to the disclosed embodiments or constructions. On the contrary, the invention is intended to cover various modifications and equivalent arrangements. In addition, while the various elements of the disclosed invention are shown in various combinations and configurations, which are exemplary, other combinations and configurations, including more less or only a single element, are also within the spirit and scope of the invention.

What is claimed is:

1. An antenna unit comprising:
   a first antenna;
   a second antenna; and
   a changeover switch configured to switch between using the first antenna and using the second antenna for reception and/or transmission of prescribed polarized waves;
   a chassis having approximately rectangular shape in cross section when viewed from a prescribed direction, wherein a first orientation is an orientation in which a plane containing a first side of the approximately rectangular shape of the chassis is approximately perpendicular to the direction of gravity, a second orientation is an orientation in which a plane containing a second side orthogonal to the first side of the approximately rectangular shape of the chassis is approximately perpendicular to the direction of gravity; and the first antenna and the second antenna are situated facing in directions 90° apart from one another when viewed from the prescribed direction; and
   a contact sensor disposed on the first side surface, wherein when contact is detected the first antenna is selected and when contact is not detected the second antenna is selected;
   wherein the first antenna in the antenna unit is positioned facing in a direction such that sensitivity of the first antenna to the prescribed polarized waves is higher than that of the second antenna if the orientation of the antenna unit with respect to the direction of gravity is a first orientation; and
   the second antenna in the antenna unit is positioned facing in a direction such that the sensitivity of the second antenna to the prescribed polarized waves is higher than that of the first antenna if the orientation of the antenna unit with respect to the direction of gravity is a second orientation different from the first orientation, wherein
   if the orientation of the antenna unit with respect to the direction of gravity is the first orientation, the changeover switch performs switching so that reception and/or transmission of prescribed polarized waves takes place using the first antenna, or
   if the orientation of the antenna unit with respect to the direction of gravity is the second orientation, the changeover switch performs switching so that reception and/or transmission of prescribed polarized waves takes place using the second antenna.

2. The antenna unit in accordance with claim 1 further comprising:
- a sensor configured to detect the orientation of the antenna unit with respect to the direction of gravity; and
- a changeover switch controller configured to control the changeover switch based on the detected orientation.

3. The antenna unit in accordance with claim 1 further comprising:
- a gravity switch configured to switch between open and closed state depending on the orientation of the antenna unit with respect to the direction of gravity; and
- a changeover switch controller configured to control the changeover switch based on the state of the gravity switch.

4. The antenna unit in accordance with claim 1 further comprising:
- a control switch operated by user according to the orientation of the antenna unit with respect to the direction of gravity; and
- changeover switch controller configured to control the changeover switch based on setting of the control switch.

5. The antenna unit in accordance with claim 1, wherein the first antenna and the second antenna respectively include a plurality of antennas for multiplex communication.

6. The antenna unit in accordance with claim 1, wherein:
- the prescribed polarized waves are vertically polarized waves; and
- the first antenna is situated in the antenna unit so as to extend along the direction of gravity when the orientation of the antenna unit with respect to the direction of gravity is the first orientation.

7. The antenna unit in accordance with claim 1, wherein:
- the prescribed polarized waves are horizontally polarized waves; and
- the first antenna is situated in the antenna unit so as to extend along a direction perpendicular to the direction of gravity when the orientation of the antenna unit with respect to the direction of gravity is the first orientation.

8. An antenna unit comprising:
- a first antenna;
- a second antenna; and
- a changeover switch configured to switch between using the first antenna and using the second antenna for reception and/or transmission of prescribed polarized waves;
- a chassis having approximately rectangular shape in cross section when viewed from a prescribed direction, wherein a first orientation is an orientation in which a plane containing a first side of the approximately rectangular shape of the chassis is approximately perpendicular to the direction of gravity, a second orientation is an orientation in which a plane containing a second side orthogonal to the first side of the approximately rectangular shape of the chassis is approximately perpendicular to the direction of gravity; and the first antenna and the second antenna are situated facing in directions 90° apart from one another when viewed from the prescribed direction; and
- a stand detachably attached to the antenna unit, wherein the antenna unit is used in the first orientation when the stand is detached and the antenna unit is used in the second orientation when the stand is attached;
- a control switch detecting attachment and detachment of the stand to select the switch position of the changeover switch, wherein when the stand is attached the second antenna is selected and when the stand is detached the first antenna is selected;
- wherein the first antenna in the antenna unit is positioned facing in a direction such that sensitivity of the first antenna to the prescribed polarized waves is higher than that of the second antenna if the orientation of the antenna unit with respect to the direction of gravity is a first orientation; and
- the second antenna in the antenna unit is positioned facing in a direction such that the sensitivity of the second antenna to the prescribed polarized waves is higher than that of the first antenna if the orientation of the antenna unit with respect to the direction of gravity is a second orientation different from the first orientation, wherein
- if the orientation of the antenna unit with respect to the direction of gravity is the first orientation, the changeover switch performs switching so that reception and/or transmission of prescribed polarized waves takes place using the first antenna, or
- if the orientation of the antenna unit with respect to the direction of gravity is the second orientation, the changeover switch performs switching so that reception and/or transmission of prescribed polarized waves takes place using the second antenna.

9. The antenna unit in accordance with claim 8 further comprising:
- a sensor configured to detect the orientation of the antenna unit with respect to the direction of gravity; and
- a changeover switch controller configured to control the changeover switch based on the detected orientation.

10. The antenna unit in accordance with claim 8 further comprising:
- a gravity switch configured to switch between open and closed state depending on the orientation of the antenna unit with respect to the direction of gravity; and
- a changeover switch controller configured to control the changeover switch based on the state of the gravity switch.

11. The antenna unit in accordance with claim 8 further comprising:
- a control switch operated by user according to the orientation of the antenna unit with respect to the direction of gravity; and
- a changeover switch controller configured to control the changeover switch based on setting of the control switch.

12. The antenna unit in accordance with claim 8, wherein the first antenna and the second antenna respectively include a plurality of antennas for multiplex communication.

13. The antenna unit in accordance with claim 8, wherein
- the prescribed polarized waves are vertically polarized waves; and
- the first antenna is situated in the antenna unit so as to extend along the direction of gravity when the orientation of the antenna unit with respect to the direction of gravity is the first orientation.

14. The antenna unit in accordance with claim 8, wherein
- the prescribed polarized waves are horizontally polarized waves; and
- the first antenna is situated in the antenna unit so as to extend along a direction perpendicular to the direction of gravity when the orientation of the antenna unit with respect to the direction of gravity is the first orientation.

* * * * *